United States Patent
Burns et al.

(10) Patent No.: US 8,234,050 B2
(45) Date of Patent: Jul. 31, 2012

(54) TORQUE LIMITING CLUTCH WITH ENGINE TORQUE MANAGEMENT FOR THERMAL PROTECTION

(75) Inventors: Timothy M. Burns, Elbridge, NY (US); Sankar K. Mohan, Jamesville, NY (US); Anupam Sharma, Brewerton, NY (US)

(73) Assignee: Magna Powertrain USA, Inc., Troy, MI (US)

( * ) Notice: Subject to any disclaimer, the term of this patent is extended or adjusted under 35 U.S.C. 154(b) by 480 days.

(21) Appl. No.: 12/552,464

(22) Filed: Sep. 2, 2009

(65) Prior Publication Data
US 2011/0054753 A1    Mar. 3, 2011

(51) Int. Cl.
G06F 7/00    (2006.01)
G06F 17/00    (2006.01)

(52) U.S. Cl. ................. 701/68; 701/67; 701/90

(58) Field of Classification Search .............. 701/54, 701/60, 67, 68, 90, 110, 112; 477/78; 60/39.282, 60/791, 281
See application file for complete search history.

(56) References Cited

U.S. PATENT DOCUMENTS

| | | | |
|---|---|---|---|
| 6,834,225 B1 * | 12/2004 | Jiang et al. | 701/67 |
| 7,630,811 B2 * | 12/2009 | Jiang | 701/54 |
| 2005/0177295 A1 * | 8/2005 | Rodrigues et al. | 701/67 |

* cited by examiner

*Primary Examiner* — Gertrude Arthur Jeanglaude
(74) *Attorney, Agent, or Firm* — Harness, Dickey & Pierce, P.L.C.

(57) ABSTRACT

A method for controlling slip across a torque limiting clutch includes determining a driveline slip threshold. A cut-off temperature is determined based on at least one of a clutch temperature, a steering wheel input and a vehicle speed. A driveline slip is determined. At least one of a spark retardation and a throttle cut-off is initiated when the clutch temperature is greater than the cut-off temperature and the driveline slip is greater than the driveline slip threshold.

15 Claims, 4 Drawing Sheets

TORQUE LIMITING CLUTCH WITH ENGINE TORQUE MANAGEMENT FOR THERMAL PROTECTION

FIELD

The present disclosure generally relates to a torque transfer device and control system for a motor vehicle. More particularly, a vehicle powertrain including a torque limiting clutch with engine torque management control is discussed.

BACKGROUND

Four wheel drive vehicles have become a major segment of the U.S. automotive market. With the advent of rising fuel prices, the pressure to improve the fuel efficiency of four wheel drive vehicles is more intense than ever.

It is contemplated that at least one reason for lower fuel efficiency of four wheel drive vehicles relates to the additional mass carried to make the vehicle capable of four wheel drive. Furthermore, many drive train systems are designed by the manufacturer to size the primary and secondary axle components according to the peak torque transmittable by the drive train rather than the peak torque required at the wheel to satisfy the vehicle's operational needs. The mass of such over-designed components may be greater than necessary.

For example, many transfer cases include mechanisms such as dog clutches or synchronizers to engage the four wheel drive system. In these systems, the front and rear driveline become rigidly linked by the splines of meeting components. No mechanical fuse or torque limiting device is present. Accordingly, a potential exists for spike loads induced in the drive line to pass through these mechanical components. In some cases, the spike loads may be twice the expected amount of torque required to slip a tire on asphalt. Components not sized properly may fail leaving the vehicle no longer drivable. While the spike loads may seldom occur, it may be necessary to design for them. Therefore, many existing designs are currently equipped with oversized components. These heavier systems provide a relatively low overall efficiency.

Electronic or hydraulic active torque transfer systems may effectively act as torque limiters to limit the torque transferred to the secondary axle. However, these devices most likely include relatively expensive and complicated actuation systems required to apply a clutch force as well as an electronic control module for properly sensing vehicle conditions and applying the clutch force appropriately. The cost associated with the active systems may be prohibitive. Accordingly, a need may exist to provide an automotive drive train solution providing improved fuel economy and lower overall four wheel drive system costs.

SUMMARY

This section provides a general summary of the disclosure, and is not a comprehensive disclosure of its full scope or all of its features.

A method for controlling slip across a torque limiting clutch includes determining a driveline slip threshold. A cut-off temperature is determined based on at least one of a clutch temperature, a steering wheel input and a vehicle speed. A driveline slip is determined. At least one of a spark retardation and a throttle cut-off is initiated when the clutch temperature is greater than the cut-off temperature and the driveline slip is greater than the driveline slip threshold.

In another form, a method for controlling slip across a torque limiting clutch includes determining a cut-off temperature based on at least one of an oil temperature, a steering wheel input and a vehicle speed. A temperature of an oil sump is determined. The temperature of the oil sump is monitored at a certain fixed interval. At least one of spark retardation and throttle cut-off are initiated when the oil sump temperature is greater than or equal to the cut-off temperature.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
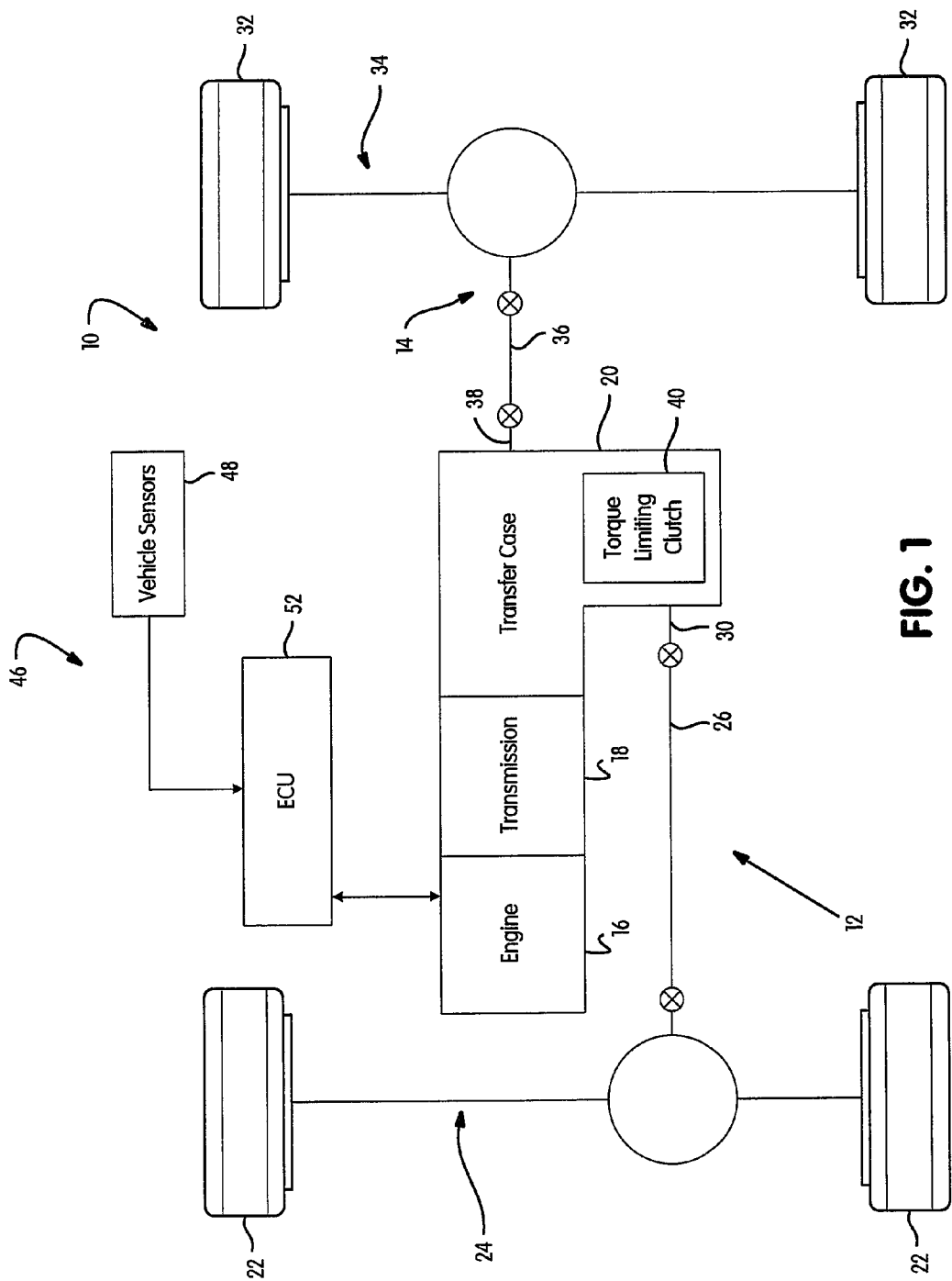
FIG. 1 is a schematic depicting an exemplary vehicle equipped with a torque limiting clutch with engine torque management system constructed in accordance with the present disclosure.

Referring to FIG. 1 of the drawings, a four-wheel drive vehicle 10 is schematically shown to include a front driveline 12, a rear driveline 14 and a powertrain for generating and selectively delivering rotary tractive power (i.e., drive torque) to the drivelines. The powertrain is shown to include an engine 16 and a transmission 18 which may be of either the manual or automatic type. In the particular embodiment shown, vehicle 10 further includes a transfer case 20 for transmitting drive torque from the powertrain to front driveline 12 and rear driveline 14. Front driveline 12 includes a pair of front wheels 22 connected via a front axle assembly 24 and a front propeller shaft 26 to a front output shaft 30 of transfer case 20. Similarly, rear driveline 14 includes a pair of rear wheels 32 connected via a rear axle assembly 34 and a rear propeller shaft 36 to a rear output shaft 38 of transfer case 20.

As will be further detailed, transfer case 20 is equipped with a torque limiting clutch 40 for providing a predetermined maximum magnitude of torque to front axle assembly 24. In addition, a control system 46 is provided for controlling operation of engine 16 and minimizing the slip across torque limiting clutch 40. Control system 46 includes vehicle sensors 48 for detecting real-time operational characteristics of motor vehicle 10 and an electronic control unit (ECU) 52 that is operable to generate electric control signals in response to input signals from sensors 48.

Figure 2:
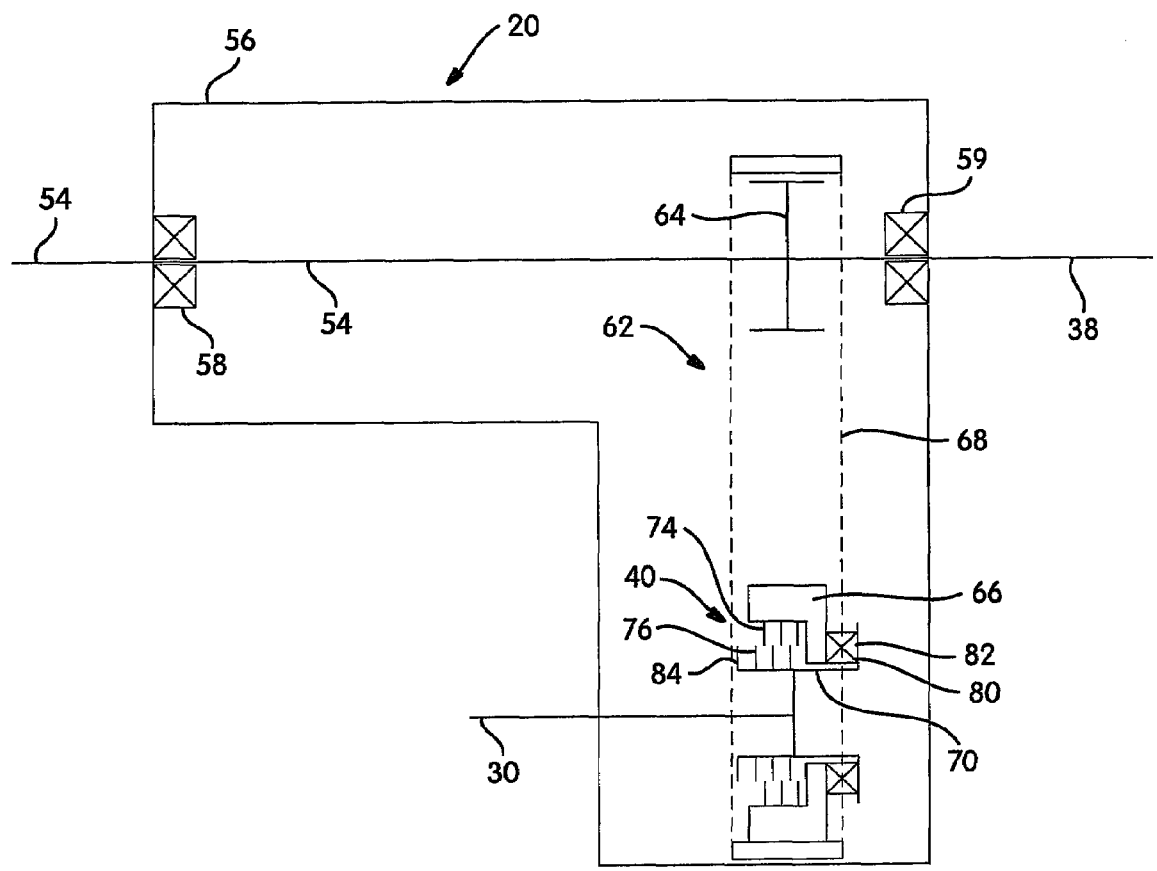
FIG. 2 is a schematic of an exemplary transfer case equipped with a torque limiting clutch.

FIG. 2 depicts transfer case 20 including an input shaft 54 that is adapted for driven connection to the output shaft of transmission 18. Input shaft 54 is supported in a housing 56 by a bearing assembly 58 for rotation about a first rotary axis.

Rear output shaft 38 is supported in housing 56 for rotation about the first rotary axis by a bearing assembly 59. Input shaft 54 may be integrally formed as a one-piece member with rear output shaft 38.

Front output shaft 30 is driven by input shaft 54 via a transfer assembly 62. Transfer assembly 62 includes a drive sprocket 64 fixed for rotation with input shaft 54 and a driven sprocket 66 drivingly interconnected to drive sprocket 64 by a flexible member 68. Driven sprocket 66 is supported for rotation on a hub 70 that is fixed for rotation with front output shaft 30. Driven sprocket 66 is axially moveable relative to hub 70. Torque limiting clutch 40 is radially positioned between hub 70 and driven sprocket 66. Torque limiting clutch 40 includes a plurality of outer clutch plates 74 fixed for rotation with driven sprocket 66 as well as a plurality of inner clutch plates 76 fixed for rotation with hub 70. Outer clutch plates 74 and inner clutch plates 76 are interleaved with one another and axially moveable relative to one another. Torque limiting clutch 40 may be a "wet clutch" having a fluid in communication with inner and outer plates 76, 74.

A spring 80 is positioned between an upturned flange 82 formed on hub 70 and driven sprocket 66. Spring 80 provides an axial load biasing driven sprocket 66, outer clutch plates 74 and inner clutch plates 76 toward a reaction plate 84 fixed for rotation with hub 70. Spring 80 is assembled in a pre-stressed condition to apply a predetermined force to torque limiting clutch 40. Based on the number of friction interfaces, a coefficient of friction of the materials at the friction interfaces and the effective radius of the friction pads, a predetermined maximum quantity of torque may be transferred by torque limiting clutch 40. The predetermined maximum torque may be based on the gross axle weight rating of the secondary axle, the tire rolling radius and a maximum estimated coefficient of friction between the tire and the ground. It is contemplated that the maximum torque transferable by torque limiting clutch 40 is set slightly greater than the slip torque of one of wheels 22.

Torque limiting clutch 40 is passive. As such, if a torque greater than the predetermined quantity is provided to torque limiting clutch 40, relative motion between outer clutch plates 74 and inner clutch plates 76 will occur. Relative motion or slip will also occur between rear propeller shaft 36 and front propeller shaft 26. No outside input of force or electrical control is required to provide the torque limiting function.

By sizing torque limiting clutch 40 in this manner, the torque carrying capacity of the components further downstream may be sized to transfer this maximum torque and not the maximum torque provided by engine 16 and transmission 18. It is contemplated that output shaft 30, front propeller shaft 26 and the components of front drive axle 24 may be reduced in size and weight compared to counterpart components found in similarly sized vehicles. The cost and weight of these front driveline components is also accordingly reduced.

Other vehicle driveline arrangements may include a torque coupling located at a position other than at a transfer case. For example, the alternate position may be within a rear axle assembly 34. A torque limiting clutch may also be positioned in series in cooperation with rear propeller shaft 36.

During operation of vehicle 10, torque limiting clutch 40 typically operates in a locked mode where drive torque is provided to front driveline 12 and rear driveline 14 when front wheels 22 and rear wheels 32 are driven at a torque magnitude less than the skid torque. In this operation mode, front propeller shaft 26 and rear propeller shaft 36 rotate at the same speed. Stated another way, no slip speed occurs between the front and rear propeller shafts 26, 36. ECU 52 determines slip speed by evaluating input signals provided by vehicle sensors 48. Vehicle sensors 48 may include Hall effect inductive sensors associated with front propeller shaft 26 and rear propeller shaft 36.

Figure 3:
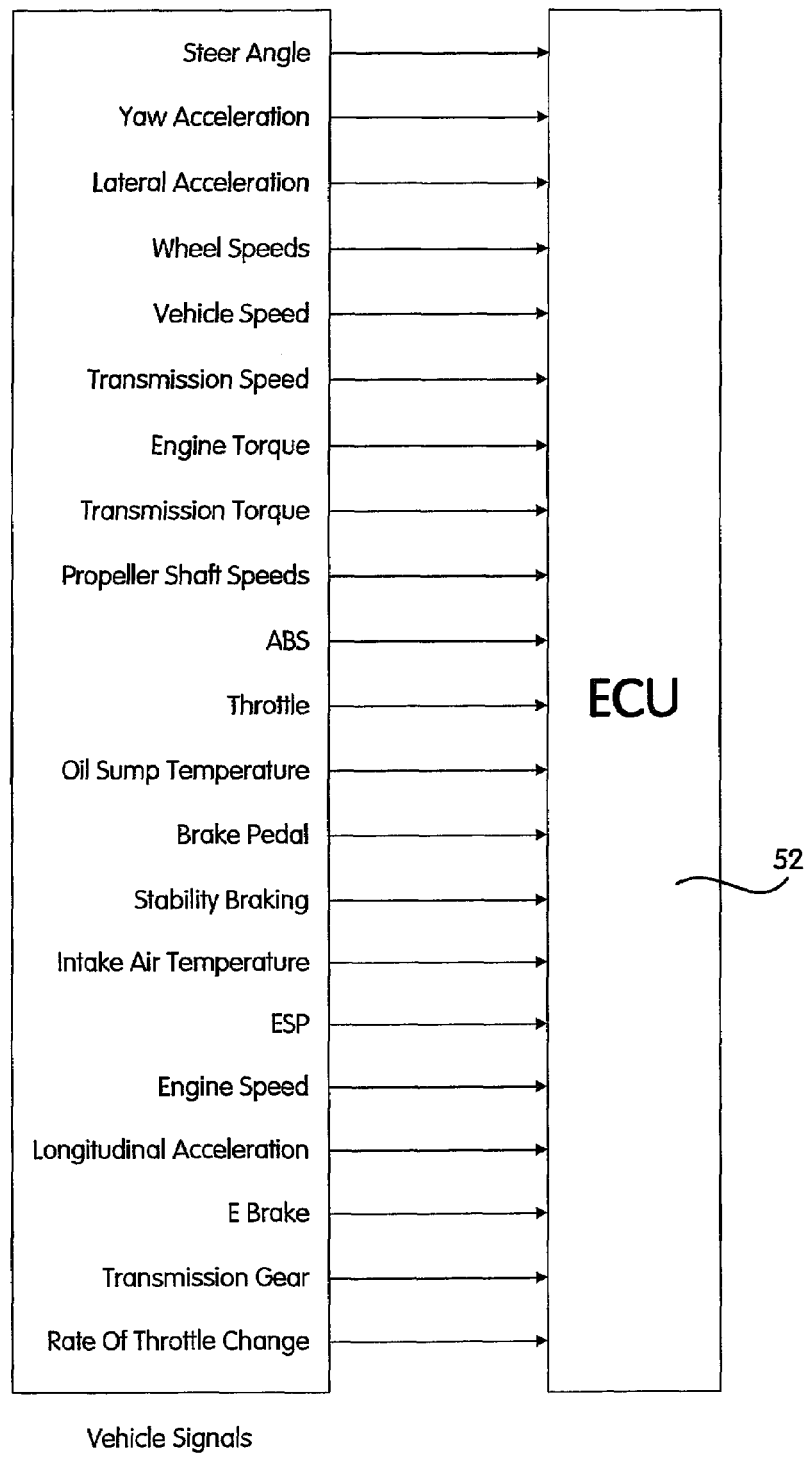
FIG. 3 is a diagram depicting vehicle signals input to an ECU.

FIG. 3 depicts a number of additional vehicle signals that may be provided to ECU 52 by additional vehicle sensors 48 or other calculations or estimations supplied via the vehicle bus. For example, ECU 52 may evaluate one or more signals indicative of steering angle, vehicle yaw acceleration, vehicle lateral acceleration, vehicle longitudinal acceleration, wheel speeds, propeller shaft speeds, vehicle speed, transmission output shaft speed, transmission output torque, engine speed, antilock braking system actuation condition, throttle position, a rate of change of throttle position, a brake pedal position, a stability and braking system actuation condition, an electronic stability program condition, an emergency brake condition and the current drive gear of the transmission.

Torque limiting clutch 40 may also operate in a slip mode where inner clutch plates 76 rotate relative to outer clutch plates 74. At this time, front propeller shaft 26 has a slip speed relative to rear propeller shaft 36. This mode of operation may occur when the magnitude of torque transferred to torque limiting clutch 40 exceeds the limit torque $T_{lim}$ of torque limiting clutch 40.

For a torque limiting device with limit torque $T_{lim}$, the slip across the clutch is calculated from front and rear propeller shaft speeds as follows:

$$w_{slip} = w_{rear\text{-}prop} - w_{front\text{-}prop}$$

The propeller shaft speeds can be directed measured or may be inferred from wheel speeds. The heat generation rate q is therefore:

$$q = T_{lim} \times w_{slip}$$

The temperature $T_{cl}$ of said torque limiting device is estimated by:

$$m_c C_p (T_{cl} - T_{ref}) = \int_0^t [q - hA(T_{cl} - T_{oil})] \, dt$$

where $m_c C_p$ is the thermal inertia of the torque limiting device, and hA is a measure of the heat removing ability of the oil sump. $T_{oil}$ is the oil sump temperature, which can be directly measured or inferred from an engine intake air temperature sensor. $T_{ref}$ is the value of $T_{oil}$ at key on.

Energy from the engine and converted to heat within torque limiting device 40 may adversely affect the efficiency of vehicle operation. Furthermore, temperature increase within torque limiting device 40 decreases the torque transferring capability of the coupling. As such, it may be desirable to limit the slip across torque limiting device 40 through engine torque management.

Engine torque can be managed by several methods, including but not limited to spark retardation and throttle cut-off. A maximum engine torque request $T_{max\ req}$ is generated by the torque limiting device monitoring software, and the engine management system uses any number of methods to limit the engine torque to less than $T_{max\ req}$. Maximum engine torque is $T_{max\ eng}$.

The maximum engine torque requested at any one time may be based on the following algorithm: if $T_{cl} \leq T_{cutoff}$ and $W_{slip} \geq W_{thresh}$, then $T_{max\ req} = K$. A cut-off temperature $T_{cutoff}$ is calculated based on one of the clutch temperature $T_{cl}$, a drive steering wheel input and vehicle speed. For example, the cut-off value $T_{cutoff}$ may be 200° F. when the vehicle is moving at 30 mph and a small steering angle (less than 30 degrees) is provided. The cut-off temperature $T_{cutoff}$ may be set to 250° F. with a vehicle speed of 10 mph and 200 degrees steering input.

Slip threshold, $W_{thresh}$ is also determined. Slip threshold $W_{thresh}$ may be based on vehicle speed. The algorithm outlined monitors the variables at a certain fixed interval (0.5 seconds for example) and manages the engine torque.

Figure 4:
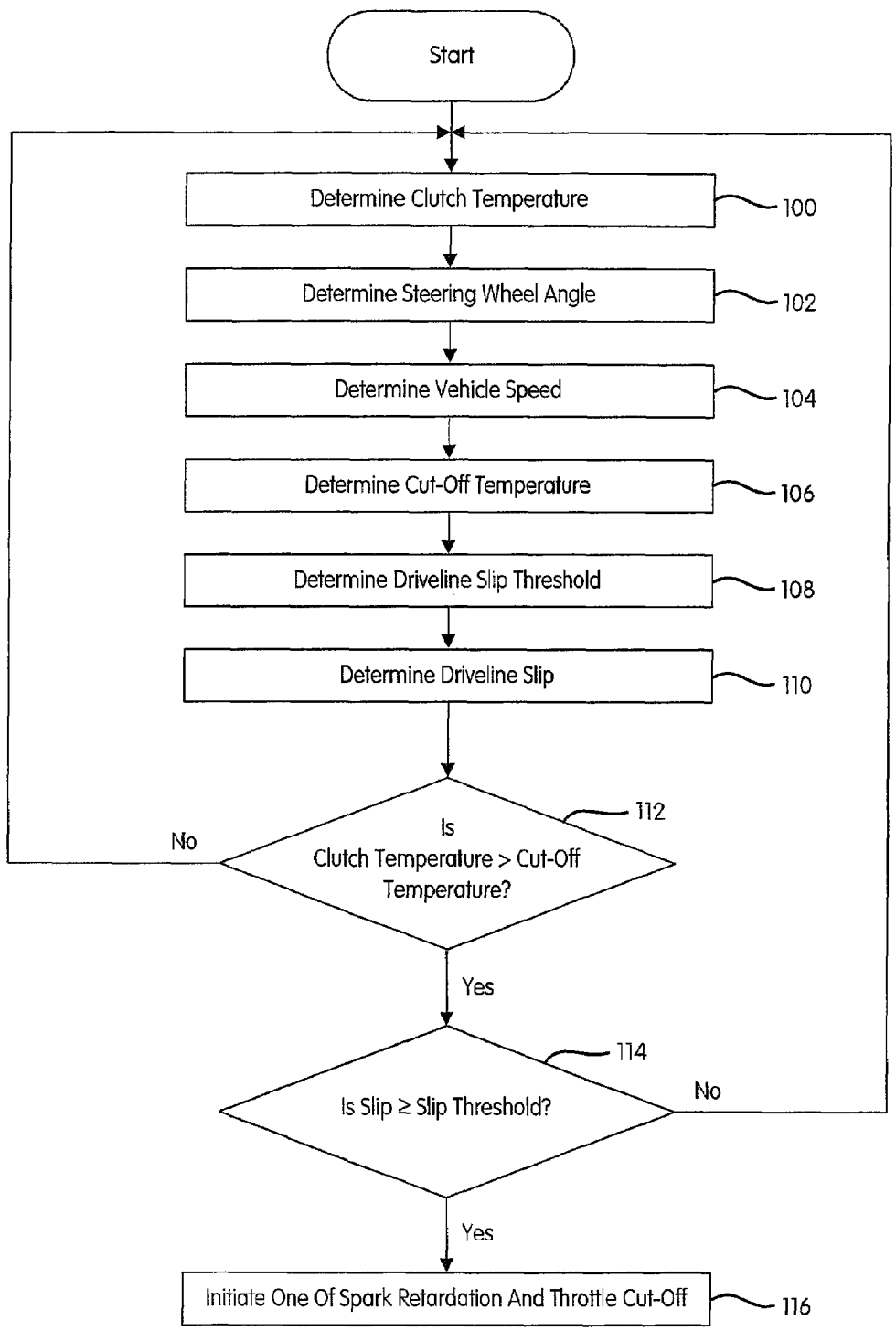
FIG. 4 is a flow diagram depicting a method of operating a torque limiting clutch with engine torque management.

FIG. 4 depicts a flow diagram outlining the method for controlling slip across torque limiting clutch 40. Step 100 includes determining a clutch temperature $T_{cl}$. A steering wheel angle is determined at step 102. Step 104 includes determining a vehicle speed. A temperature of an oil sump may be determined and monitored to estimate clutch temperature $T_{cl}$. At step 106, a cut-off temperature $T_{cutoff}$ is determined based on at least one of the clutch temperature, the steering wheel angle and the vehicle speed.

Slip threshold, $W_{thresh}$ is determined at step 108. Slip threshold $W_{thresh}$ may be based on vehicle speed. For example, at low speeds of 2.5 mph or less, the slip threshold may be set relatively low to obtain an aggressive throttle cut-off. For speeds above 35 mph, the slip threshold is set high to minimize engine torque control. At speeds from 2.5 to 7 mph, the slip threshold may vary to provide a sliding scale for the rate at which throttle input is allowed to increase in case slip is detected. At speeds of 7 to 35 mph, the slip threshold is set at a moderate level and is a constant. Step 110 includes determining the driveline slip, $W_{slip}$. Propeller shaft sensors (FIG. 3) may provide rotational speed data for rotating shafts positioned on opposite sides of torque limiting clutch 40. A difference in speed is slip. To limit slip across torque limiting clutch 40, at least one of spark retardation and throttle cut-off is initiated at step 116 when the clutch temperature $T_{cl}$ is greater than the cut-off temperature $T_{cutoff}$ and wheel slip $W_{slip}$ is greater than or equal to a wheel slip threshold $W_{thresh}$ as determined at steps 112 and 114.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method for controlling slip across a torque limiting clutch, comprising:
    determining a driveline slip threshold;
    determining a cut-off temperature based on at least one of a clutch temperature, a steering wheel input and a vehicle speed;
    determining a driveline slip; and
    initiating at least one of spark retardation and throttle cut-off when the clutch temperature is greater than the cut-off temperature and the driveline slip is greater than the driveline slip threshold.

2. The method of claim 1 wherein the cut-off temperature is determined using an algorithm.

3. The method of claim 1 further including measuring a temperature of an oil sump associated with the clutch with a sensor to determine the clutch temperature.

4. The method of claim 3 wherein the temperature of the oil sump is determined from an engine intake air temperature sensor.

5. The method of claim 4 further including monitoring the temperature of the oil sump at a fixed time interval.

6. The method of claim 1 wherein determining the driveline slip includes comparing rotational speeds on opposite sides of the torque limiting clutch.

7. The method of claim 1 wherein determining the driveline slip includes determining a wheel speed.

8. The method of claim 1 wherein determining the driveline slip threshold is based on the vehicle speed.

9. The method of claim 8 wherein the driveline slip threshold decreases as vehicle speed decreases.

10. A method for controlling slip across a torque limiting clutch, comprising:
    determining a cut-off temperature based on at least one of an oil temperature, a steering wheel input and a vehicle speed;
    determining a temperature of an oil sump;
    monitoring the temperature of the oil sump at a certain fixed interval; and
    when the oil sump temperature is greater than or equal to the cut-off temperature, initiating at least one of spark retardation and throttle cut-off.

11. The method of claim 10 further including determining a driveline slip threshold and determining a driveline slip, wherein one of spark retardation and throttle cut-off are initiated when the driveline slip is greater than the driveline slip threshold.

12. The method of claim 11 wherein the driveline slip threshold determination is based on vehicle speed.

13. The method of claim 12 wherein the cut-off temperature increases as vehicle speed decreases.

14. The method of claim 10 wherein determining oil sump temperature includes direct measurement by a sensor.

15. The method of claim 10 wherein the temperature of the oil sump is determined from an engine intake air temperature sensor.

* * * * *